US005379882A

United States Patent [19]

Kuchta et al.

[11] Patent Number: 5,379,882

[45] Date of Patent: Jan. 10, 1995

[54] JOINTED BARRIER STRIP

[75] Inventors: Richard Kuchta, Tolland; Richard S. Szewczyk, Madison; Joseph R. Vivirito, South Windsor; Thomas King, Norwich; Ivan Markowitz, Glastonbury, all of Conn.

[73] Assignee: Gerber Garment Technology, Inc., Tolland, Conn.

[21] Appl. No.: 124,803

[22] Filed: Sep. 21, 1993

[51] Int. Cl.[6] .............................................. B65G 13/02

[52] U.S. Cl. ............................ 198/689.1; 198/803.01; 198/850; 271/196

[58] Field of Search ................ 198/689.1, 803.01, 850, 198/851, 853; 271/196, 197

[56] References Cited

U.S. PATENT DOCUMENTS

| | | | |
|---|---|---|---|
| 3,359,648 | 12/1967 | Overly et al. | 271/197 |
| 4,646,911 | 3/1987 | Pearl et al. | 198/689.1 |
| 4,730,526 | 3/1988 | Pearl et al. | 198/689.1 X |
| 5,189,936 | 3/1993 | Gerber et al. | 198/851 X |

*Primary Examiner*—Cheryl L. Gastineau

*Attorney, Agent, or Firm*—McCormick, Paulding & Huber

[57] ABSTRACT

A jointed barrier seal is provided as part of the conveyor apparatus and is connected to support members such that the end faces of the members can be readily assembled with end seals without the need of adhesive or other materials otherwise used to affix the barrier strip to the involved support member.

11 Claims, 5 Drawing Sheets

JOINTED BARRIER STRIP

BACKGROUND OF THE INVENTION

This invention relates to a sheet material conveying and cutting apparatus of the type shown in prior U.S. Pat. No. 5,189,938 wherein an endless conveyor belt made up of interconnected slat-like support members are used to support and advance sheet material to and from a cutting station, and deals more particularly with improvements in such an apparatus for more readily attaching barrier strips to the interconnected slat-like support members to effect sealing of spacing between juxtaposed slats and the bristle blocks which are attached to them.

In U.S. Pat. No. 5,189,936 issued to Gerber et al., entitled CONVEYOR FOR SUPPORTING AND ADVANCING SHEET MATERIAL AND CUTTING MACHINE INCLUDING SUCH CONVEYOR, a conveyor apparatus is disclosed wherein a conveyor belt comprising a conveying apparatus is made up of interconnected slat-like support members. It has also been found that despite the mechanical engagement which are provided for between the support members as set forth in the aforementioned U.S. Pat. No. 5,189,936, in the form of tongue and groove joints disposed between related slats, that this tongue and groove relationship nevertheless still does not seal the space between two slats, but instead provides a passage through which air is allowed to seep into the bristle bed. These support members each have disposed along one lateral side edge thereof an adhesively attached thin strip of compressible foam plastic material or the like which acts to provide an air seal between adjacent slats to prevent entrance of outside air into the vacuum duct through whatever space that may otherwise exist between adjacent slats. Disposed on the opposite lateral side edge of each support member is an air impermeable barrier strip made, for example, of a thin sheet of gum rubber which extends upwards beyond the slat and along the associated side edge of the bristles of the supporting member and is adhesively secured to the side face of the slat below the bristle block. While such strips have been and continue to be an effective means to effect these stated ends, it has been found, however that during the manufacturing process, that the fabrication of such interconnected slat-like support members is somewhat hindered by the time it takes to fasten such barrier strips to the related sides of each slat. At least with regard to the strip of compressible foam plastic material, this strip usually undergoes successive compression cycles during the course of the operation of the cutter table so as to loose some of its memory capability, and hence its sealing ability. Also, in the past, barrier strips were attached to the slats using an adhesive to bond a portion of the strip to the slat. The process of waiting for setup time in the adhesive and insuring that the edges align with the bottom of the slat to insure that its top edge is correspondingly aligned with the top of the bristles made for additional work which in turn added to the manufacturing time thereby enhancing the cost of slat fabrication. Aditionally, even after assembly, and in the course of normal operation, the reciprocating knife of the cutter makes cuts in the barrier strips to an extent where the strips must be replaced as a matter of regular maintenance.

Accordingly, it is desirable to provide a means by which barrier strips can be readily attached to an associated slot with the relative orientations between the strip and the slat being repeatable form one slat to the next to thereby lower the cost of production of fabrication of the conveyor and insure reliability in product manufacture and further to simplify routine maintenance of the conveyor.

Accordingly, it is an object of the present invention to enhance the seal between related slats in order to improve efficiency in the vacuum holddown capacity of a cutter bed.

Other aspects and improvements offered by the invention will become apparent from the following description and appended claims.

SUMMARY OF THE INVENTION

An apparatus for supporting and advancing sheet material comprises a frame and an endless conveyor belt supported on the frame for movement along a given line of travel through two horizontally spaced apart rotatable end units about which the belt is trained to define a path of movement with an upper run and an lower run each extending between the end units. The belt comprises a plurality of elongate generally rectangular support members each having a length dimension and a width dimension with the length dimension extending transversely of the belt line of travel and the width dimension extending parallel to the line of travel and being defined by first and second opposite spaced apart faces. The support members are arranged in succession along the travel path by means connecting the support members to one another in succession to form the belt such that each of the support members when positioned in the upper run define a flat upwardly facing horizontal sheet material support surface defined by a plurality of bristle blocks. Barrier strip means are associated with each support member having means for connecting them to the support members to prevent seepage of vacuum from one support member to those other support members which are juxtaposed relative to it. Each of the support members has at least one means formed in one of the first and second faces for cooperating with the connecting means of the barrier strip means to effect a mechanical connection therebetween.

BRIEF DESCRIPTION OF THE PREFERRED EMBODIMENT

DETAILED DESCRIPTION OF THE PREFERRED EMBODIMENT

Figure 1:
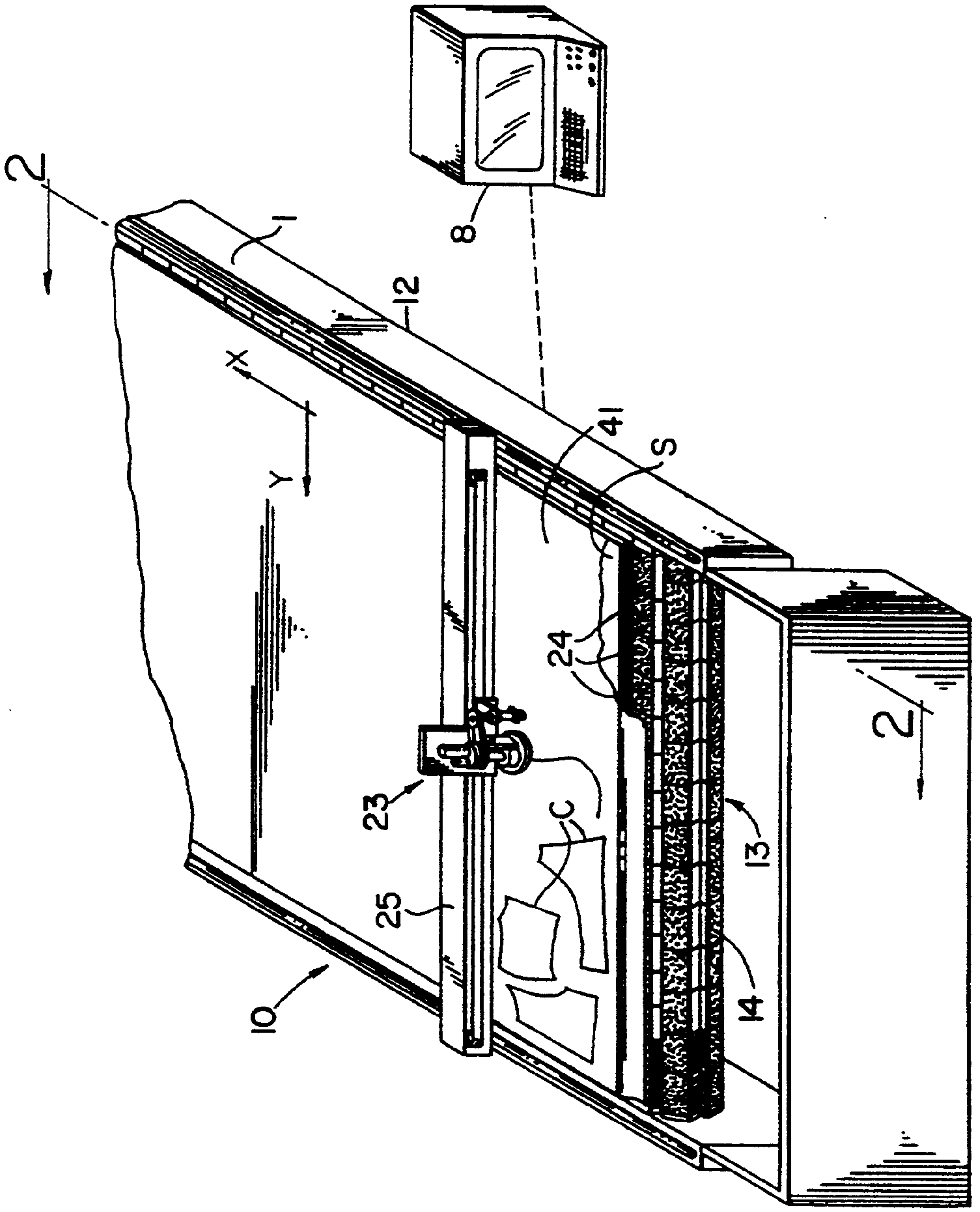
FIG. 1 is a fragmentary perspective view of a cloth cutter machine using a sheet material conveyor apparatus embodying the invention.

Turning to FIG. 1, a sheet material supporting and conveying apparatus 1 is therein shown as part of an automatically controlled cutting machine used for the purpose of creating pattern pieces later sewn together and jointed to one another to form garments. The illustrated machine includes a table 10, having a stationary frame 12 supporting a sheet material supporting and advancing conveyor apparatus 13. The sheet material 41 shown is in layup form consisting of a number of sheets of material spread on top of one another and which are compacted to create a substantially rigid piece once the vacuum is applied to the conveyor surface. A plurality of bristle blocks 24,24 are carried by the conveyor apparatus 13 and provide a penetrable support surface S upon which the layup is supported. The apparatus further includes a cutter 23 having a reciprocating blade 7 capable of penetrating the surface S up to a depth of about one inch and movable along the table in the indicated Y coordinate direction and carried on a movable beam 25 which is driven along the X coordinate direction to make cuts C in the layup 41 corresponding to pattern data maintained by the controller 8.

Figure 2:
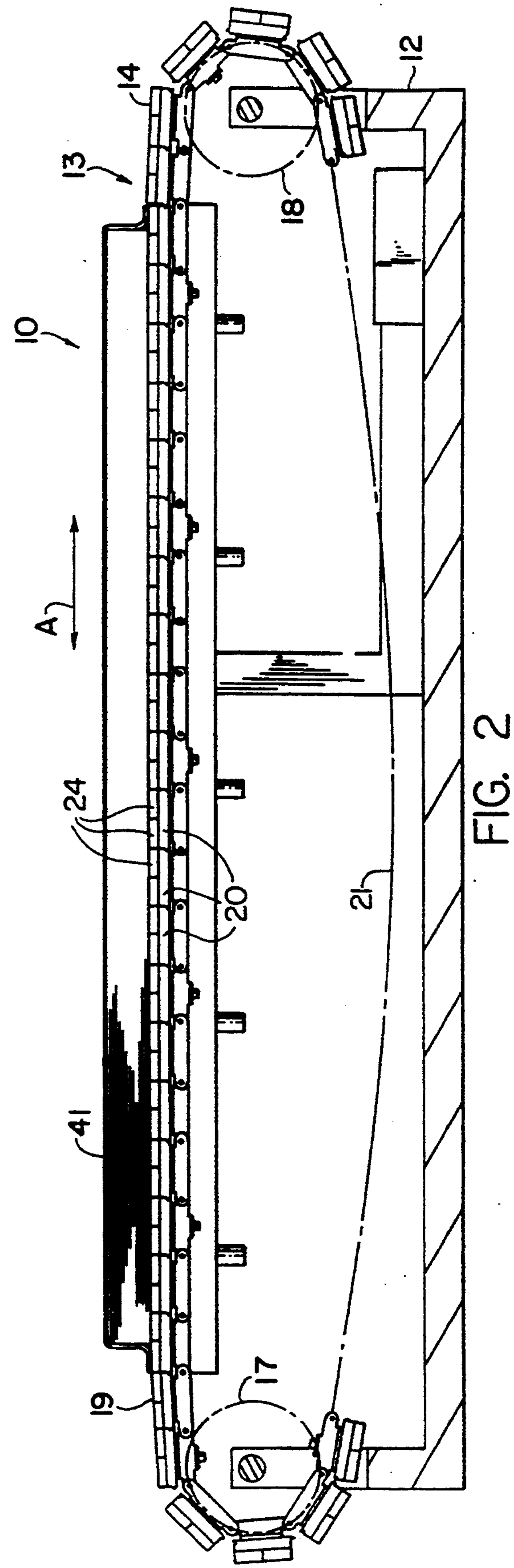
FIG. 2 is a side elevation view taken along a vertical section through the apparatus of FIG. 1.

The conveyor as best seen in FIG. 2, includes an endless conveyor belt 14 trained over two rotatable end units 17 and 18 so as to form an upper run 19 and a return lower run 21, with the upper run being moveable along a horizontal path indicated by the arrow A between the end units 17 and 18. The end units 17 or 18 are rotatable about parallel horizontal axes fixed relative to the frame and includes suitable sprockets for engaging and guiding the conveyor belt. A drive motor (not shown) is provided for the purpose of driving one of the end units in rotation to inturn move the conveyor in either direction along the indicated line of travel A. The conveyor belt is comprised of a plurality of elongated rigid members which in the preferred embodiment take the form of metallic slats 20,20 which may be made from an extrusion of aluminum or similar extrudable metal. The slats are connected to one another at their long ends by a linking means causing the slats as a collection to be moved in the endless circular path as discussed above. For a more detailed description of the manner by which the slats connect to the linking means and through the linking means to the frame, reference may be had to aforementioned U.S. Pat. No. 5,189,936, which patent being hereby incorporated by reference.

Figure 3:
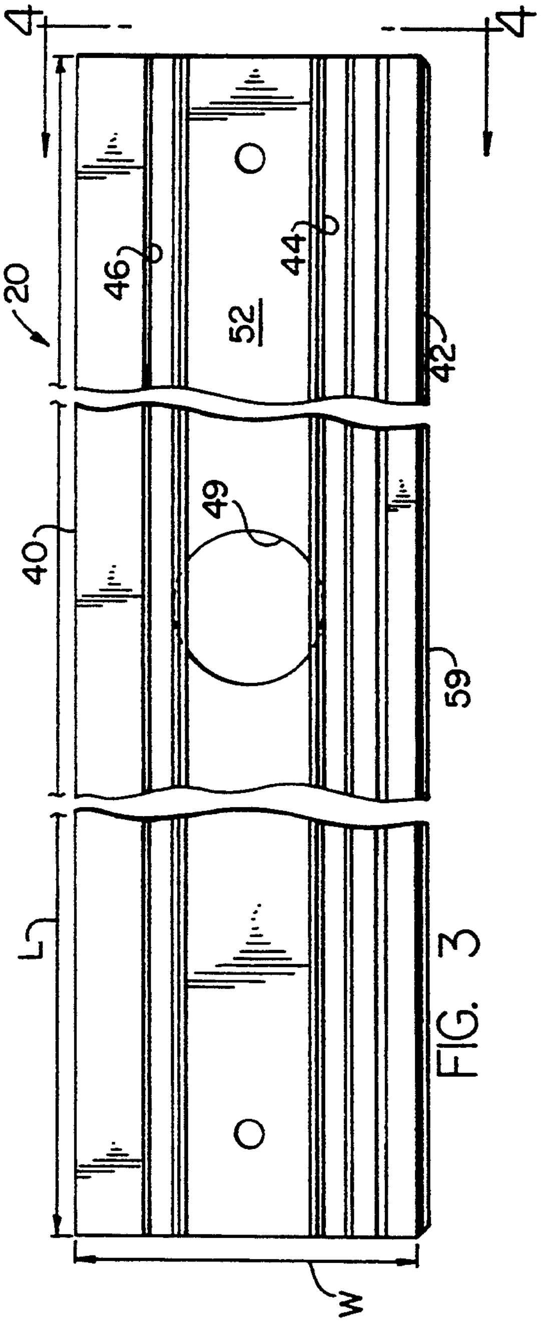
FIG. 3 is a top plan view of a slat shown removed from the apparatus.
Figure 4:
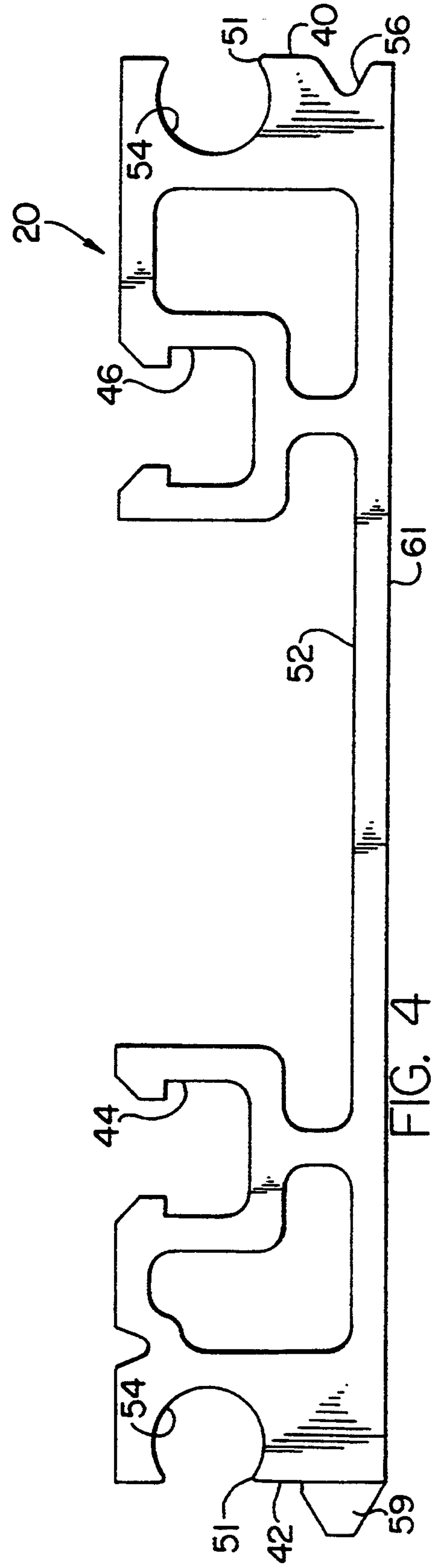
FIG. 4 is a side elevation view of the slat of FIG. 3 with the bristle block, barrier strip and seal piece removed.
Figure 5:
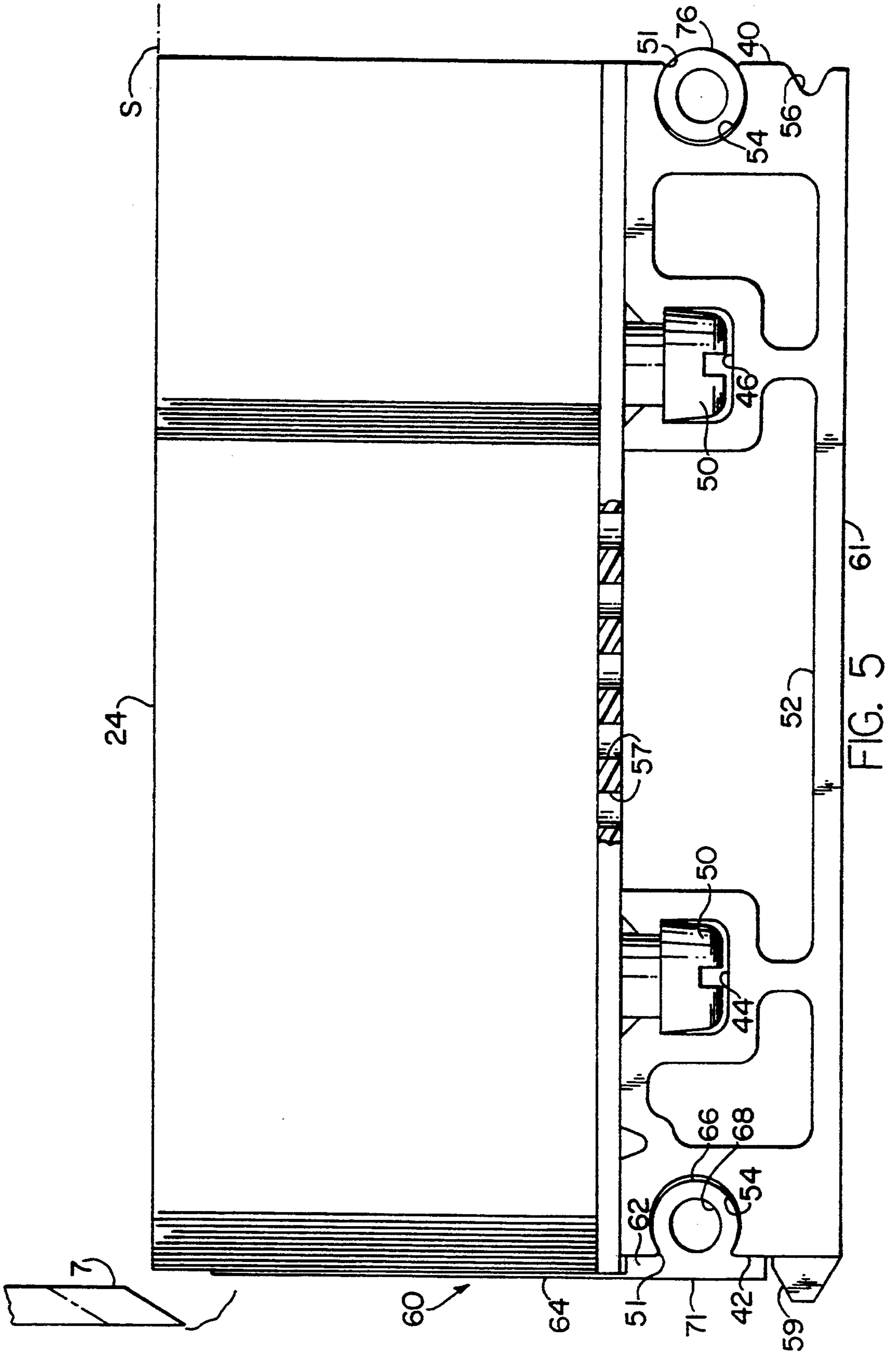
FIG. 5 is a side elevation view showing the slat of FIG. 3 with the block schematically shown and the barrier strip and seal piece attached.

As shown in FIGS. 3, 4, and 5, each slat is adapted to hold a plurality of bristle blocks 24,24 along its length L and is defined along its width W by first and second faces 40 and 42 directed generally orthogonally relative to the support surface S created by the conveyor belt upper run. Each slat 24,24 includes a base portion 61 and an integrally formed central portion 52 which includes an opening 49 formed in the base portion communicating with windows in the manifold for the purpose of allowing vacuum pressure to communicate into the slat and through holes 57,57 provided at the base of the bristle blocks.

Formed laterally inwardly of the first and second faces 40 and 42 of the slat are first and second upwardly facing channels 44 and 46, respectively, which run the length L of the slat and are provided for the purpose of receiving lugs 50,50 which depend from the base of the bristle block and are so complementarily spaced relative to the cross-section of the channels that they attach to the slat by either moving vertically relative to the slat to cause the lugs to connect by snap-action or by sliding the block longitudinally of the slat to its desired position.

Disposed along the base portion of each of the slats is a tongue and complementary groove part 59 and 56 respectively which co-act with correspondingly sized and shaped grooves and tongues formed on juxtaposed slats such that when the slats are moved through the upper run of the conveyor, the tongue of one slat aligns and is caused to engage within the groove of the other succesively ordered slat to insure that the proper vertical relationship between the two parts is achieved.

Figure 6:
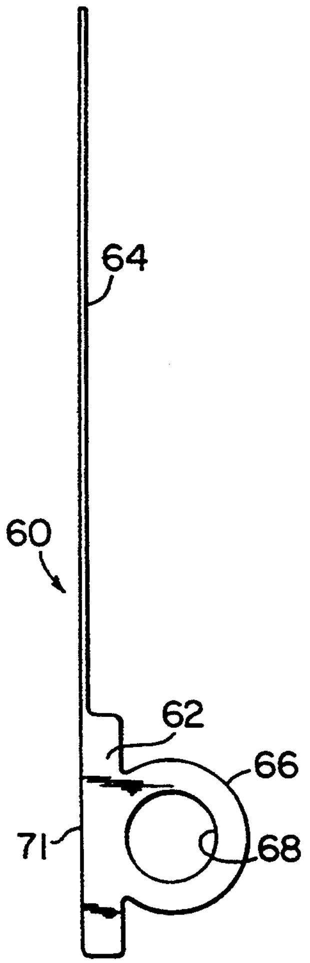
FIG. 6 is a side elevation showing the barrier strip shown separately of the slat.
Figure 7:
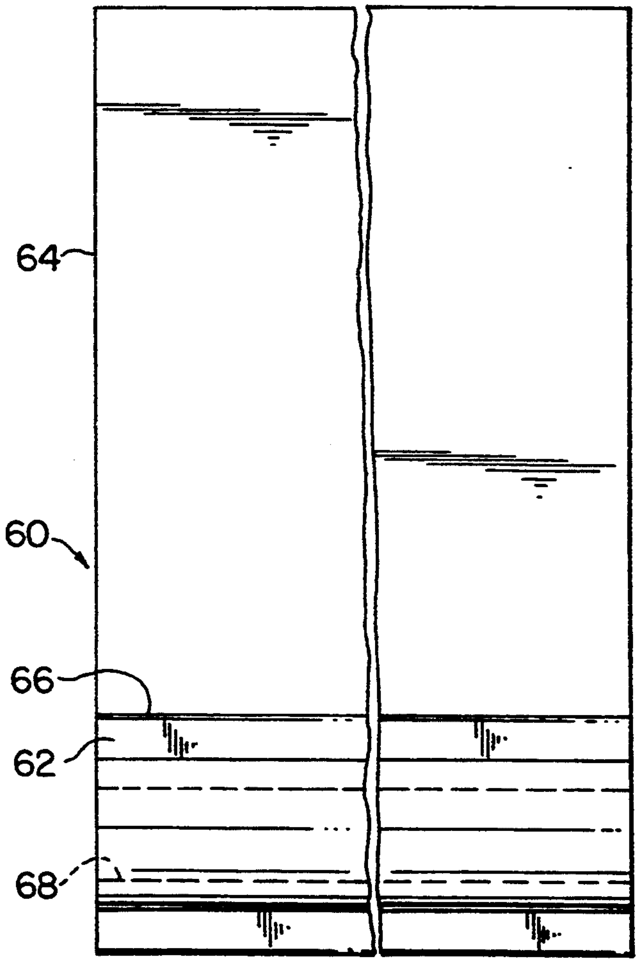
FIG. 7 is a partial fragmentary view in front elevation view of the barrier strip of FIG. 6.

To effect sealing between adjacently disposed bristle blocks carried on respective ones of the adjacently disposed slats, an improved barrier seal means 60,60 as shown in FIG. 6 is provided. This means includes a base portion 62 and an integrally connected strip portion 64 extending longitudally with the base portion, with the base portion including an elongate bead 66 integrally connected therewith for the purpose of connecting the barrier seal means to the slat. The barrier strip means 60 is formed from an appropriate poloymer such as a soft polyvinyl chloride (PVC) having a sufficiently rigid characteristic to maintain its generally elongated shape, but nevertheless having requisite flexibility to snap in place within the slat.

Each slat is provided with at least one substantially circular cutout 54,54 interrupted by respective ones of the end faces 40,42 into which is formed for the purpose of receiving seal members associated with each end face of the slat. The interruption of the substantially circular cut-out by the end faces of the slat, as seen in cross-section in FIG. 5, is such that the remaining circular configuration of the cutout forms a throat 51 which provides an ample gripping effect against the member inserted into each of the cutouts. That is, the bead portion 66 of the seal means 60 is a hollow generally circular member as seen in cross-section with the hollow interior 68 providing requisite flexibility such that the bead can be snap fit into the cutout through the throat 51 and thereafter caused to expand substantially back to its normal shape once within the cutout by the memory characteristics of the material. In this way, the strip can be attached to the slat by simply running a tool along the base of the seal means 60 to force the insertion of the bead portion through the throat in this manner. For purposes of illustration the outer radius of curvature of the bead portion is about 0.157 inch and is received within the circular confines of the cutout whose inner radius is just slightly larger.

As best seen in FIG. 5, the strip portion 64 of the seal means 60 stands tall above the base portion 62 by an amount equal to approximately the height of the bristle member and may be slightly shorter, for example, on the order of about 0.2 inch. The strip portion 64 is substantially flexible and is caused to be turned back toward the bristle block as the block is moved off the table by the action of a take off ramp which is disposed at the discharge end of the table. For a more complete description of the action of the take-off ramp, reference may be had to U.S. Pat. No. 5,228,554 issued to Kuchta, et al. on Jul. 20, 1993 and entitled MATERIAL TAKE-OFF RAMP AND SYSTEM FOR A CONVEYOR CUTTERBED AND METHOD OF USE, which application being hereby incorporated by reference. The strip for this purpose has a thickness of about 0.015 of an inch and is therefore highly flexible, but nevertheless remains air impermeable to adjacent bristle blocks.

In the preferred embodiment, each slat includes two cutouts 54,54, the second of which cut-outs is provided on the other of the end faces 40,42 not carrying the seal means 60. The second cutout is adapted to receive an elongate flexible tube 76 having an outer diameter sufficient to be received within the cutout, but nevertheless being sufficient in size to project outwardly past the first face 40 for the purpose of abutting against the adjacently disposed front face 71 of the base of the seal means 60 when succesively ordered slats are located along the upper run of the belt. In this way, sealing between adjacently disposed slats and bristle blocks is effected along first and second side faces of each slat.

By the foregoing, the invention has been described by way of illustration rather than limitation and numerous modifications and substitutions may be made without departing from the spirit of the invention. For example, the illustrated slat is shown with the seal means 60 in a leading position, but it is well within the purview of the invention to rotate the slats of the belt 180 degrees so the means 60 are disposed along the trailing edge.

We claim:

1. An apparatus for supporting and advancing sheet material comprising:

a frame;

an endless conveyor belt supported on the frame for movement along a given line of travel through two horizontally spaced apart rotatable end units about which said belt is trained to define a path of movement for said belt with an upper run and an lower run each extending between said end units;

said belt comprising a plurality of elongate generally rectangular support members each having a length dimension and a width dimension with the length dimension extending transversely of the belt line of travel and said width dimension extending parallel to said line of travel and being defined by first and second opposite faces;

said support members being arranged in succession along said path by means connecting said support members to one another in succession to form said belt, each of said support members when positioned in said upper run having a flat upwardly facing horizontal sheet material support surface defined by a plurality of bristle blocks;

barrier strip means having means for connecting to said support members to prevent seepage of vacuum from one support member to those support members which are juxtaposed relative to it; and each of said support members having at least one means formed in one of said first and second faces for cooperating with said connecting means of said barrier strip means to effect connection therebetween.

2. An apparatus as defined in claim 1 wherein at least one elongate cutout is formed in each of said first and second faces of each of said support members, said cutout formed in said one of said first and second faces receiving said barrier strip means and said cutout formed in the other of the said first and second faces receiving an abutment means having means for connecting to said member and a portion thereof extending outwardly beyond the other of the first and second faces to create a yieldable barrier member therein which is caused to abut the adjacently disposed barrier strip means of the next sucessively ordered support member; said barrier strip means and said abutment means respectively connected to one of said first and second faces of a given support member so that opposed first and second faces of neighboring support members are sealed against air seepage.

3. An apparatus as defined in claim 2 further characterized by said cutouts take the form of an interrupted circle as seen in vertical cross-section having a portion of its shape cut so as to create a throat which contains the connecting means of said barrier strip means and said abutment means.

4. An apparatus as defined in claim 3 further characterized in that said barrier strip means includes a body portion, a bead portion and a strip portion integrally connected with one another, said bead portion extending outwardly of said body portion and generally oriented orthogonally to said strip portion.

5. An apparatus as defined in claim 4 further characterized in that said bead portion has a hollow interior which causes the bead to deformable when inserted within the associated cutout of the one of the first and second faces in which it is inserted.

6. An apparatus as defined in claim 5 further characterized in that said support members include a base portion and a means for receiving a bristle block, said barrier strip means when connected to the support member extending upwardly from said base portion with the bristles of the bristle block.

7. An apparatus as defined in claim 6 further characterized in that the cutout associated with the abutment means having a portion which extends outwardly of the second face and acts against the front face of the next successive barrier strip means.

8. An apparatus as defined in claim 7 further characterized by said support members each including an elongated tongue member extending generally laterally outwardly along the base portion of said slat along its first face and a corresponding groove member extending generally laterally inwardly of the second face thereof such that the tongue of one member is received within the groove of the next adjacent member and the tongue of the involved support member receives the tongue of the next successive slat when the slats are caused to move through the upper run of the conveyor belt.

9. An apparatus as defined claim 8 further characterized by said barrier strip means being made from an air impermeable polymer.

10. An apparatus as defined in claim 9 further characterized in that each of said support members is formed from an extrusion of aluminum material.

11. An apparatus for supporting and advancing sheet material comprising:

a frame;

an endless conveyor belt supported on the frame for movement along a given line of travel through two horizontally spaced apart rotatable end units about which said belt is trained to define a path of movement for said belt with an upper run and an lower run each extending between said end units;

said belt comprising a plurality of elongate generally rectangular support members each having a length dimension and a width dimension with the length dimension extending transversely of the belt line of travel and said width dimension extending parallel to said line of travel and being defined by first and second opposite faces;

said support members being arranged in succession along said path by means connecting said support members to one another in succession to form said belt;

each of said support members when positioned in said upper run collectively forming a flat upwardly facing horizontal support surface;

barrier strip means having means for connecting it to said support members to prevent seepage of vacuum from one support member to those support members which are juxtaposed relative to it; and each of said support members having at least one means formed in one of said first and second faces for cooperating with said connecting means of said barrier strip means to effect connection therebetween; and wherein two elongate cutouts are formed in each of said first and second faces of each support member for sealing the other of said first and second end faces against air seepage from the opposed face of the next successive member, said cutout formed on the other of the said first and second faces receiving an abutment means having means for connecting to said member and a portion thereof extending outwardly beyond the other of the first and second faces to create a yieldable barrier member therein which is caused to abut the adjacently disposed barrier strip means of the next sucessively ordered support member.

* * * * *